Patented Jan. 2, 1940

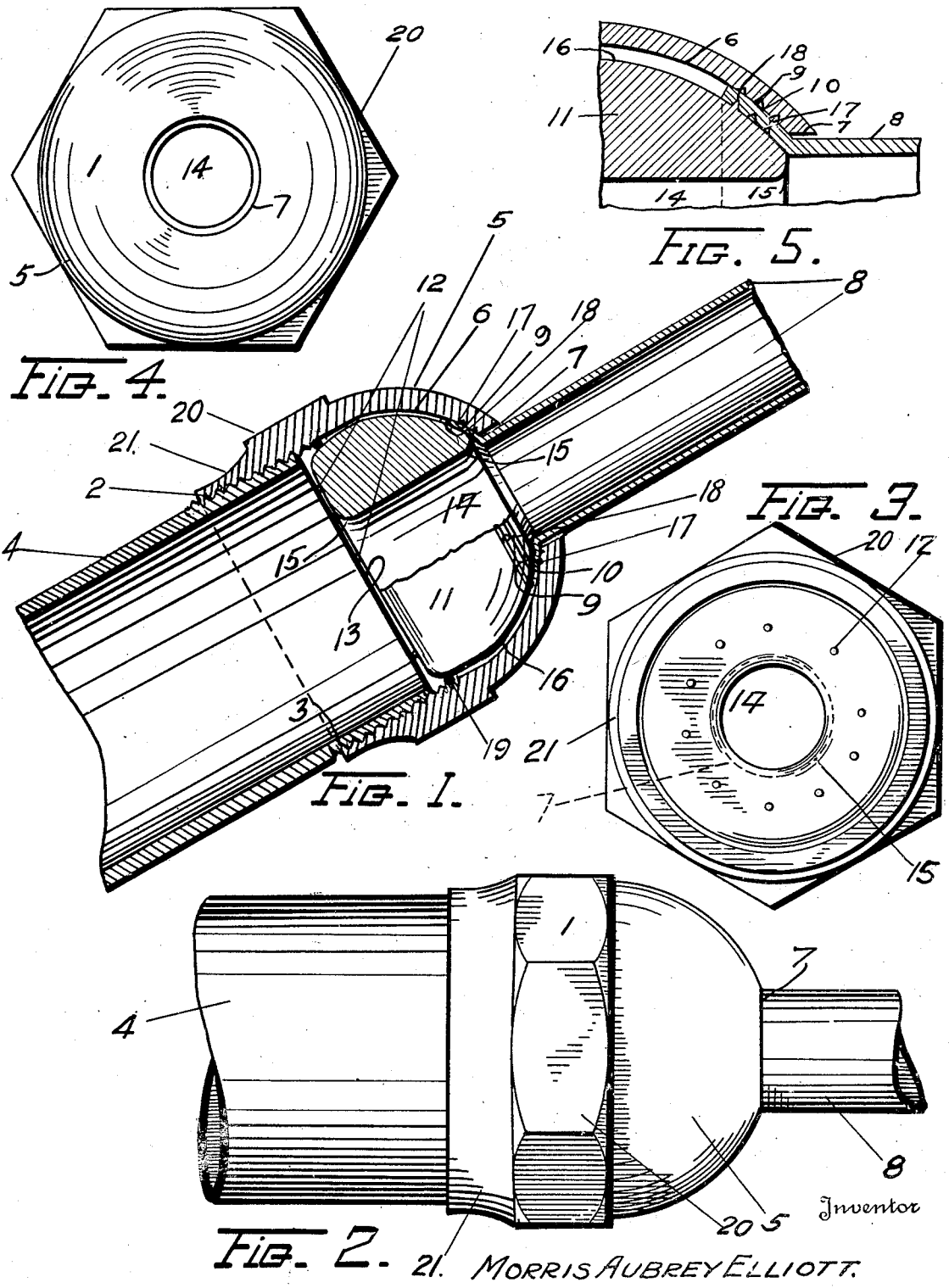

2,185,726

UNITED STATES PATENT OFFICE 2,185,726

ADAPTER COUPLING

Morris Aubrey Elliott, Baltimore, Md.

Application December 21, 1938, Serial No. 247,133

3 Claims. (Cl. 285—86)

This invention refers to couplings for piping and more particularly to those used for connecting rigid piping to soft or flexible piping. It has, among its objects, to develop a coupling of this type that will adapt itself to various mis-alignments in the position of the pipings connected, and thereby prevent leakage at the connection or excessive stresses on the parts. Also to provide an arrangement that will obstruct the pulling of the pipes out through the coupling after being inserted for connection, in a manner that is objectionable, prior to the tightening of the coupling thereon. Other objects will become evident as the invention is more fully described.

In the drawing, which illustrates an embodiment of this invention—

Figure 1 indicates a coupling embodying this invention, and shown attached to a rigid pipe and flexible tubing, in section with portions broken away to show construction.

Figure 2 is a view in elevation of the coupling as applied to the piping mentioned.

Figure 3 shows large end of coupling.

Figure 4 shows small end of coupling.

Figure 5 is an enlarged sectional elevation showing the ridges, etc.

Similar reference characters refer to similar parts throughout the drawing.

The conventional form of coupling utilized for the work in question is limited in its scope and does not provide the adaptability to the series of conditions that arise in practice, and by reason of this, do not compensate for the stresses that arise in its use with flexible and rigid piping connections.

In this form of the invention, the coupling consists of an exterior shell 1 arranged with internal screw threading 2 on its rigid-piping connecting the upper section for engagement with the screw threads 3 on the rigid pipe 4. The lower section of the exterior shell 5 is formed as indicated in the drawing, with its internal surface and contour 6 rounded to a spherical curved form. The shell is provided with an orifice 7 in its lower section for the placing of the flexible piping 8 therein. The portion 9 adjacent to the orifice is adapted to engage on the outer surface 10 of the flexible tubing where same is funnelled for the purpose. A thimble member 11 having its upper face flat but provided with projecting fins 12 for engagement with the face portion 13, at the end of the rigid piping, to prevent slipping while pressed against same. The thimble is hollow, having a passage 14 through it, the lower portion of which is flared at 15.

The external surface of the thimble member is of spherical contour 16 as modified by the removal of the portion registering with the funnel of the flexible piping and the passage 14 thereof. The whole thimble member is slightly less than the diameter of the shell internally. The spherical contour of the thimble externally and of the shell internally at 6, serve to provide a ball joint that is particularly suitable for this type of coupling. The construction permits an adjustment of the coupling and piping to suit any malalignments that will be met with in usual practice and still keep the coupling tight against leakage. In addition there are ridges 17 on the internal surface of shell, that will come against the ridges 18 formed on the exterior surface of the thimble, and thereby limit the amount of adjustment, as well as serve to obstruct the removal of the parts from each other, even when loosely connected. A light spring coil 19 is placed in the grooves of the screw threads engaging each other between the rigid piping and shell, and provides sufficient frictional resistance to keep these parts together, even though not tightened. It also affords a means for holding the mandrel plug used in the coupling when the device is made ready for shipping.

The action of the coupling on the flexible piping is to swage out the funnel against the internal surface of the shell and press the spherical surface of the thimble tightly against it, and thereby make the coupling give a tight joint. Should the pipings be out of line, the ball joint effect will enable the coupling to take up the same without excessive stresses on the parts. The ridges 17 and 18, at the same time will press into the external and internal surfaces of the funnel of the flexible piping, and hold same securely, as well as lessen the chances of leakage.

The coupling body is provided exteriorly with a hexagon form 20 about its central portion, for the application of a wrench and to reinforce the coupling at this location, to prevent the splitting of the same as the pressure is placed on the screw threads of the rigid piping. The rigid pipe connecting portion of the coupling 21 is reduced in cross-section and flared as noted. This enables the coupling to resiliently adapt itself to the stresses placed upon it by the taper of the pipe screw threads. With the reinforcement of the enlarged portion at 20, the portion 21 is rendered able to do the work intended of it, without possibility of being unduly strained, while the wrench is manipulating the coupling. The ridges 18 may be omitted, or, if used, are not intended to obstruct the movement of the thimble element and its adjustment to the positions of the piping against it.

While but one form of the invention is shown in the drawing, it is not desired to limit this application for patent, to the construction shown in the drawing, and described in the specifications, otherwise than limited by the prior art, as it is appreciated that other forms might be designed and made that would employ the same principles and come within the scope of the appended claims.

Having thus described the invention, what is claimed is:

1. A coupling of the class described for connecting rigid piping with soft tubing together comprising in combination, a shell with one end portion of hemispherical hollow form with an opening at the summit thereof adapted to permit the insertion of soft tubing axially therethrough, and its other end portion formed cylindrically and internally screw threaded to receive rigid piping, said internal hemispherical surface being provided with relatively narrow groves adjacent the opening aforesaid, a thimble member under pressure against the internal surface of the shell by the direct contact of the rigid piping, formed to fit closely in the hemispherical portion of the shell and having a central passage therethrough with the terminations thereof rounded, the peripheral surface of the member having ridges thereon adapted to align approximately with the grooves and press into soft tubing placed through the opening with its end portion flared in the shell between same and the member, the upper surface of the member being flat and provided with projecting fins arranged to directly contact the end surface portion of rigid piping screwed into the cylindrical end portion of the shell, the edges of the upper surface being substantially rounded to permit a ball-like movement of the member in the shell.

2. A coupling of the class described for connecting rigid piping with soft tubing together comprising in combination, a shell with one end portion of hemispherical hollow form with an opening at the summit thereof adapted to permit the insertion of soft tubing axially therethrough, and its other end portion formed cylindrically and internally screw threaded to receive rigid piping, said internal hemispherical surface being grooved adjacent the opening aforesaid, a thimble member in direct contact with the shell and rigid piping, formed to fit closely in the hemispherical portion of the shell and having a central passage therethrough with the terminations thereof rounded, the peripheral surface of the member having ridges thereon adapted to align approximately with the grooves and press into soft tubing placed through the opening with its end portion flared in the shell between same and the member, the upper surface of the member being flat and provided with projecting fins arranged to contact the end surface portion of rigid piping screwed into the cylindrical end portion of the shell, the edges of the upper surface being substantially rounded to permit a ball-like movement and angular adjustment of the member in the shell the central passage of the member being aligned with the passages in the pipe and piping placed therein, and means for retaining the member in the shell frictionally and resiliently.

3. A coupling of the class described for connecting rigid pipe and soft tube together, comprising in combination, a shell with one end portion of hemispherical hollow form having an opening at the summit thereof, adapted to receive soft tubing therethrough, and its other end portion cylindrical and screw threaded to receive rigid piping, and a solid thimble member with its peripheral surface formed to conform with that of the internal surface of the shell so as to coact therewith and permit surface adjustment and to compress and flare the end portion of soft tubing inserted through the opening so as to bind same therebetween, said thimble member having a passage therethrough registering with the axis of the piping and tubing for the passage of contents therethrough, ridges on the surface of the thimble for providing spaced pressure action on the tubing for tightening and leak-proofing the same, said thimble having a surface for contacting the end face portion of the rigid piping and receiving pressure there from on the screwing of the rigid piping on the shell, and transmitting the pressure through the thimble to internal surface of the shell and the soft tubing held therebetween.

MORRIS AUBREY ELLIOTT.